US010048612B2

(12) United States Patent
Tsukada

(10) Patent No.: US 10,048,612 B2
(45) Date of Patent: Aug. 14, 2018

(54) IMAGE FORMING APPARATUS

(71) Applicant: Brother Kogyo Kabushiki Kaisha, Nagoya-shi, Aichi-ken (JP)

(72) Inventor: Takamasa Tsukada, Ichinomiya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/716,687

(22) Filed: Sep. 27, 2017

(65) Prior Publication Data

US 2018/0101110 A1 Apr. 12, 2018

(30) Foreign Application Priority Data

Oct. 6, 2016 (JP) ................................ 2016-198153

(51) Int. Cl.

| | |
|---|---|
| ***G06F 3/12*** | (2006.01) |
| ***G03G 15/04*** | (2006.01) |
| ***G03G 15/00*** | (2006.01) |
| *G03G 15/01* | (2006.01) |

(52) U.S. Cl.

CPC ... *G03G 15/04036* (2013.01); *G03G 15/5016* (2013.01); *G03G 15/5087* (2013.01); *G03G 15/0142* (2013.01)

(58) Field of Classification Search

CPC ......... G03G 15/04036; G03G 15/5016; G03G 15/5087; G03G 15/0142

See application file for complete search history.

(56) References Cited

U.S. PATENT DOCUMENTS

2013/0286433 A1 10/2013 Matsushima et al.
2014/0340315 A1 11/2014 Ikeda et al.
2015/0280306 A1* 10/2015 Asai ........................ H01Q 1/06 343/842

FOREIGN PATENT DOCUMENTS

JP 2013-228540 A 11/2013
JP 5590274 B1 9/2014
JP 2016-082478 A 5/2016

* cited by examiner

*Primary Examiner* — Moustapha Diaby
(74) *Attorney, Agent, or Firm* — Banner & Witcoff, Ltd.

(57) ABSTRACT

An image forming apparatus, including a housing, a communication interface, a light source unit, and a light guide, is provided. The communication interface includes a communication board and a looped antenna for near field communication. The communication board is arranged to be covered by the housing and has an aperture portion. The looped antenna is arranged on a circumferential edge of the aperture portion to be looped around the aperture portion. The light source includes a light source board, arranged at a position opposite to the housing across the communication interface along a direction of thickness of the communication board, and a light source mounted on the light source board. The light guide extends from the light source through the aperture portion toward the housing.

6 Claims, 7 Drawing Sheets

IMAGE FORMING APPARATUS

CROSS REFERENCE TO RELATED APPLICATION

This application claims priority from Japanese Patent Application No. 2016-198153, filed on Oct. 6, 2016, the entire subject matter of which is incorporated herein by reference.

BACKGROUND

Technical Field

An aspect of the present invention is related to an image forming apparatus having a communication interface for near field wireless communication.

Related Art

An image forming apparatus, e.g., a printer, may be equipped with a lamp unit, which may emit light to inform a user of a condition of the image forming apparatus. The lamp unit may be arranged at a frontward position in the image forming apparatus for better visibility to the user.

The image forming apparatus may be equipped with a communication interface, through which the image forming apparatus may communicate with external information terminal devices, such as smartphones and tablet computers, in a near field wireless communication method. Such a communication interface may be preferably arranged at a frontward position in the image forming apparatus, as well as operation buttons and a display, so that the communication interface may be easily reached by the user to provide better operability.

As a consequence of the consideration for the better operability, user interfacial devices, including a lamp, a communication interface, operation buttons, and a display, may often be arranged collectively at an frontward area in the image forming apparatus.

SUMMARY

Meanwhile, the user interface devices collected for better operability may occupy a substantial volume in the image forming apparatus and may increase an entire volume of the image forming apparatus. In this regard, it may be difficult to arrange a communication interface additionally to the user interface devices in the frontward area in the image forming apparatus and still reduce a volume of the image forming apparatus.

The present disclosure is advantageous in that an image forming apparatus, having a communication interface and a lamp unit arranged efficiently to provide operability, of which volume may be effectively reduced, is provided.

According to an aspect of the present disclosure, an image forming apparatus, including a housing and a communication interface, is provided. The communication interface includes a communication board arranged to be covered by the housing, the communication board having an aperture portion; and a looped antenna for near field communication, the looped antenna being arranged on a circumferential edge of the aperture portion to be looped around the aperture portion. The image forming apparatus further includes a light source unit, including a light source board arranged at a position opposite to the housing across the communication interface along a direction of thickness of the communication board; and a light source mounted on the light source board. The image forming apparatus further includes a light guide extending from the light source through the aperture portion toward the housing.

BRIEF DESCRIPTION OF THE ACCOMPANYING DRAWINGS

DETAILED DESCRIPTION

Hereinafter, embodiments of the present disclosure will be described with reference to the accompanying drawings. In the following description, directions related the image forming apparatus 1 and each part or item included in the image forming apparatus 1 will be mentioned on basis of a user's position to ordinarily use the image forming apparatus 1. For example, in FIG. 1, a viewer's lower-leftward side and upper-rightward side will be referred to as the user's frontward side and rearward side, respectively. A viewer's lower-rightward side and upper-leftward side in FIG. 1 will be referred to as a right-hand side and a left-hand side for the user to use the image forming apparatus 1, respectively. An up-to-down or down-to-up direction in FIG. 1 may be referred to as a vertical direction, and a front-to-rear or rear-to-front direction may be referred to as a front-rear direction. Further, a left-to-right or right-to-left direction may be referred to as a widthwise direction.

Figure 1:
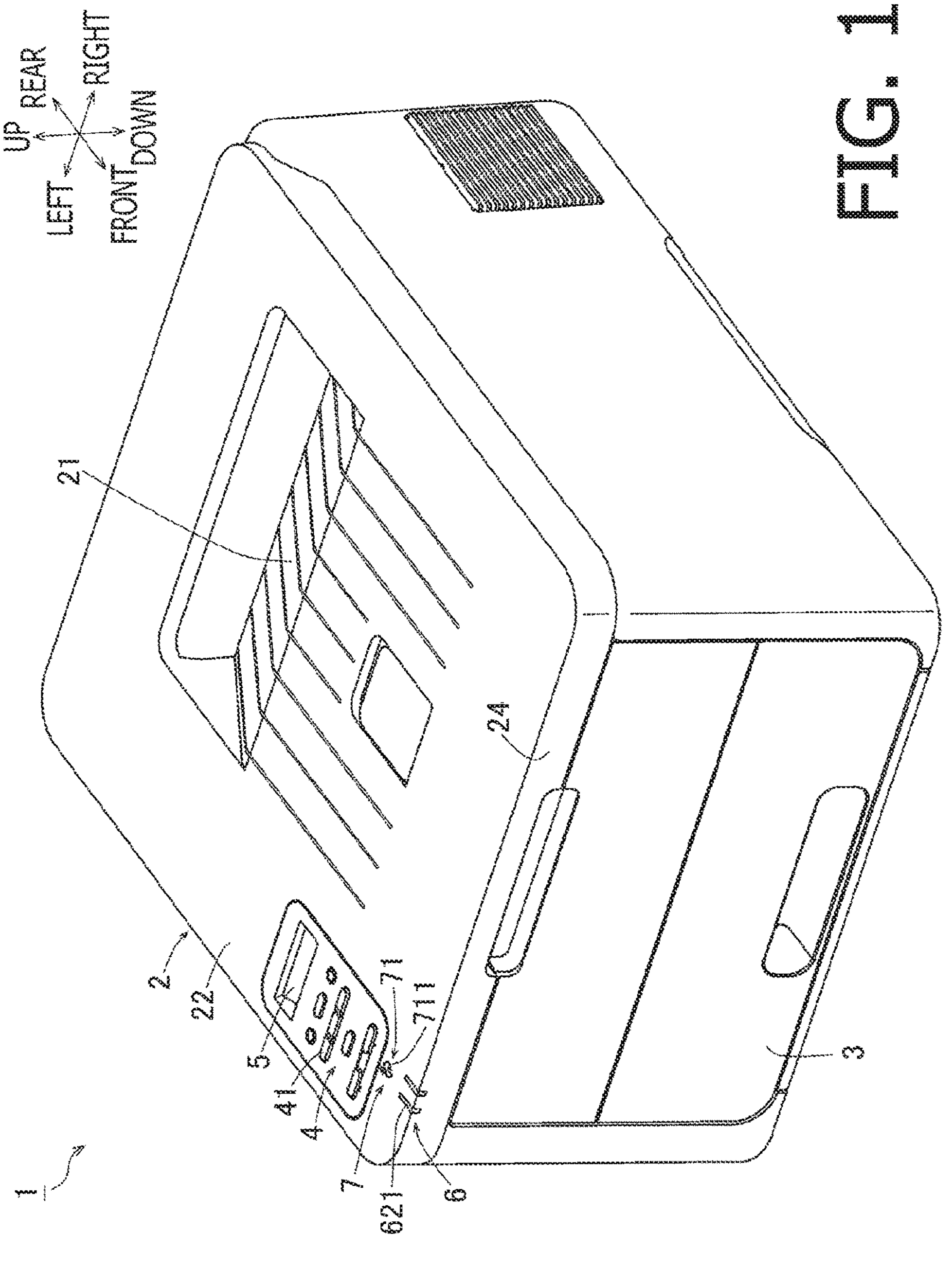
FIG. 1 is a perspective view of an image forming apparatus according to an embodiment of the present disclosure.

The image forming apparatus 1 includes, as shown in FIG. 1, a housing 2, a sheet cassette 3, and an ejection tray 21.

The housing 2 forms an outline of the image forming apparatus 1 and may be in an approximate shape of a rectangular box made of, for example, resin. The housing 2 accommodates frames, which are not shown, to support the sheet cassette 3, a conveyer (not shown), an image forming unit (not shown), and an ejection unit (not shown).

The sheet cassette 3 may store one or more sheets therein and is arranged at a lower position in the image forming apparatus 1. The sheet cassette 3 may be pulled frontward out of the housing 2 to load sheets.

The conveyer is a mechanism to convey the sheets from the sheet cassette 3 to the image forming unit and includes conveyer rollers. The image forming unit forms images on the sheets conveyed by the conveyer. The image forming unit may form images in a known style, which includes, for example, but not necessarily limiting to, an electro-photographic style, an inkjet printing style, and a thermal head printing style. The ejection unit is a mechanism to convey the sheets outside the housing 2 from the image forming unit.

The ejection tray 21 may support the sheets ejected by the ejection unit and is arranged at an approximately central position on an upper face 22 of the housing 2. The ejection tray 21 is formed to incline upper-frontward and lower-rearward so that the sheets with the images formed thereon may be ejected frontward to along the inclination and rest on the ejection tray 21.

Figure 2:
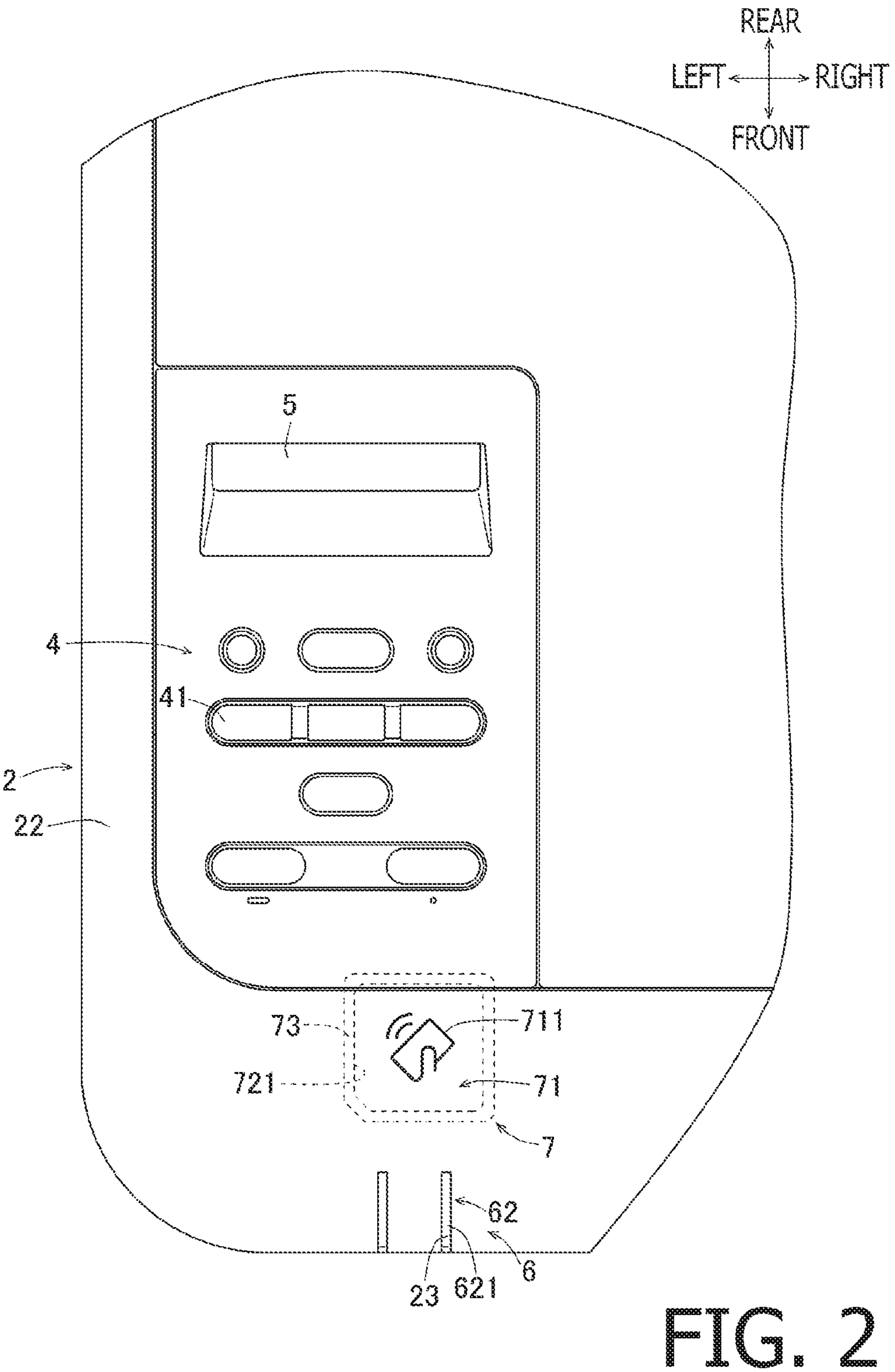
FIG. 2 is an enlarged plan view of a leftward-front area in the image forming apparatus according to the embodiment of the present disclosure.
Figure 3:
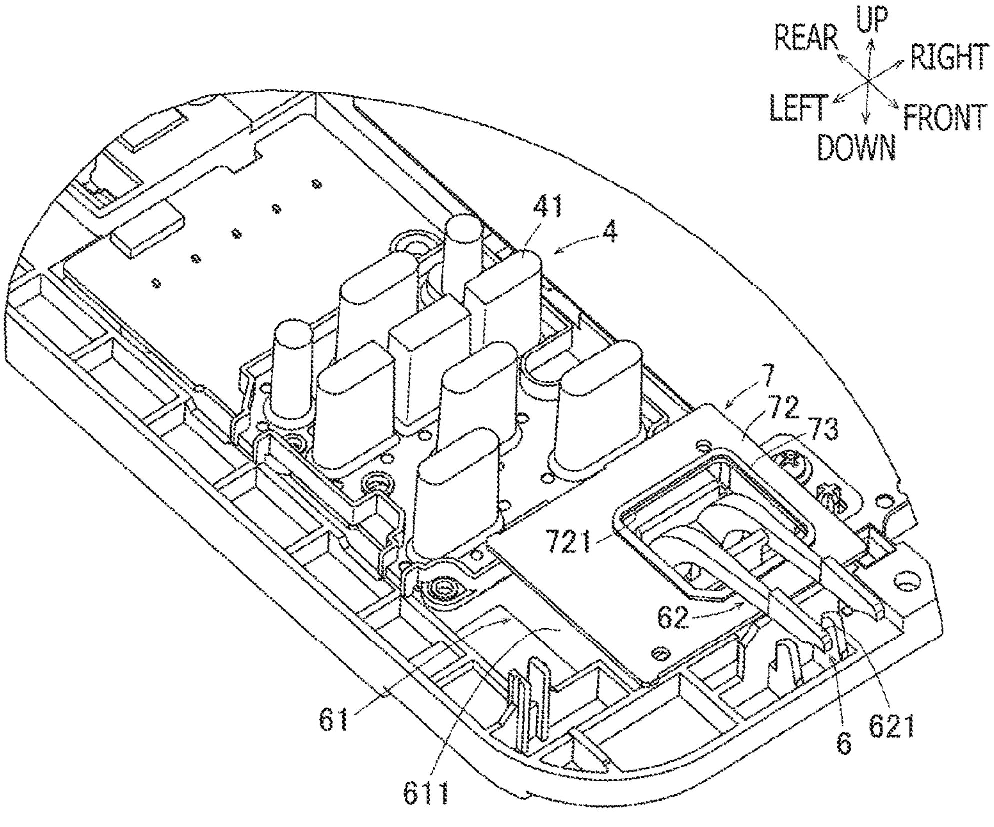
FIG. 3 is a perspective view of the leftward-front area in the image forming apparatus with a housing being removed according to the embodiment of the present disclosure.
Figure 4:
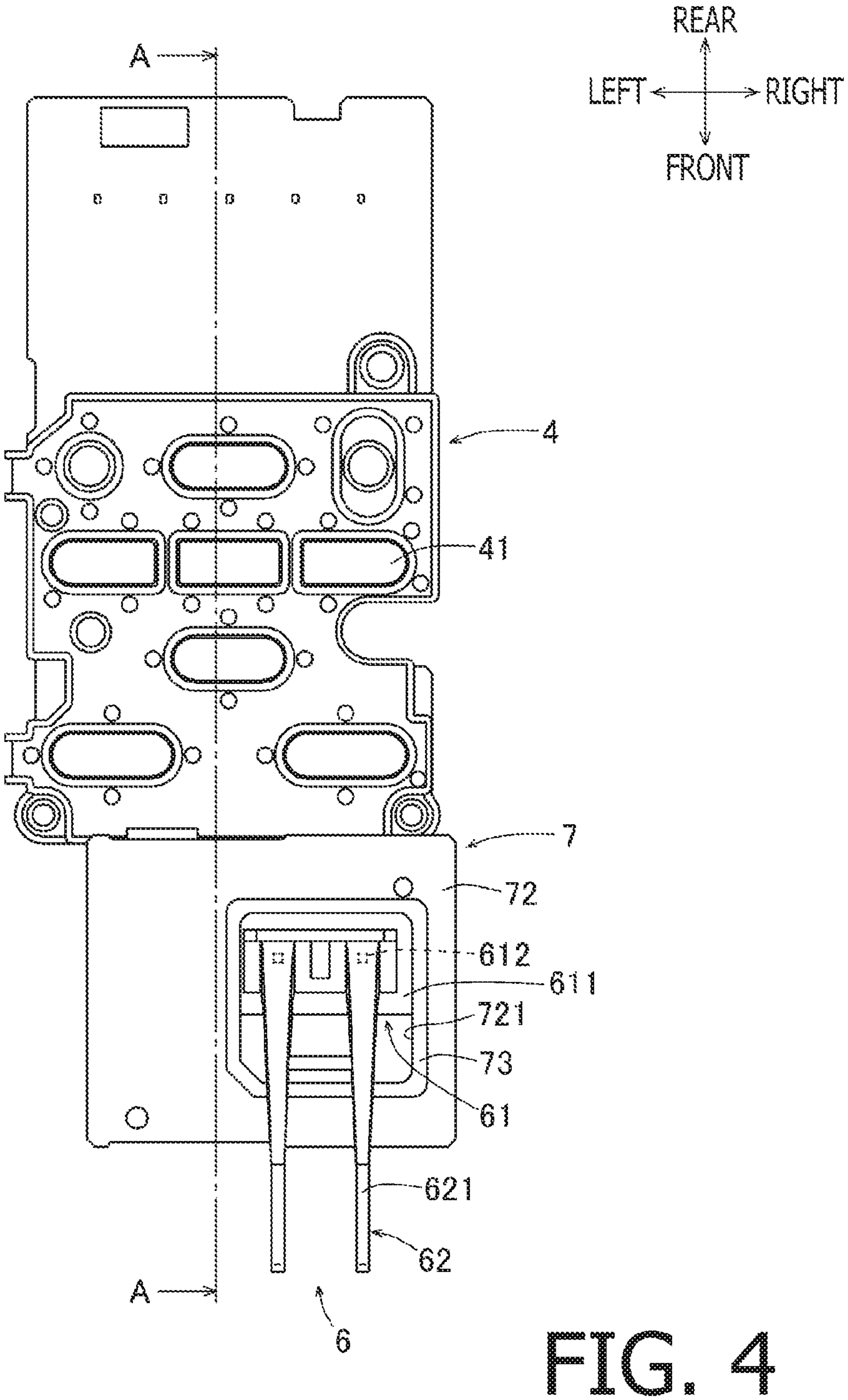
FIG. 4 is a plan view of an operation unit, a lamp unit, and a communication interface in the image forming apparatus according to the embodiment of the present disclosure.

At a sideward-front area, e.g., a leftward-front area, on the upper face of the housing 2, as shown in FIGS. 1 and 2, collectively arranged are user interface devices, which include an operation unit 4, a display 5, a lamp unit 6, and a communication interface 7.

The operation unit 4, through which a user may manipulate the image forming apparatus 1, includes a plurality of buttons 41. In the present embodiment, for example, nine (9) buttons 41 are provided. The buttons 41 may include an automatic returnable switch, which may be turned on while the button 41 is maintained pressed by the user and may be turned off when the button 41 is released. The buttons 41 may include a power button, by which the image forming apparatus 1 may be powered on and off, a menu button, by which menus to be displayed in the display 5 may be switched, an OK button, by which contents presented in the display 5 may be entered, and a return button, by which a screen in the display 5 may return to a previous screen.

The display 5 may be, for example, a liquid crystal display and is arranged at a rearward position with respect to the operation unit 4 on the upper face 22 of the image forming apparatus 1. The display 5 may display messages to inform the user of conditions of the image forming apparatus 1, such as ready, printing, preparing for printing, cancelling a job, and an error. Optionally, the operation unit 4 and the display 5 may be integrated into a single piece of, for example, liquid crystal touch-sensitive panel.

The lamp unit 6 may indicate conditions of the image forming apparatus 1 with light and includes a light emitter 621. The light emitter 621 is arranged at a frontward position with respect to the operation unit 4 on the upper face 22 of the image forming apparatus 1. The light emitter 621 may emit light at the frontward position, with an upper face and a front face thereof being exposed through an opening 23, which is formed at a front edge of the upper face 22 of the housing 2. The light emitter 621 may glow in a predetermined color to indicate the conditions of the image forming apparatus 1.

The lamp unit 6 may include a plurality of, e.g., two (2), light emitters 621 so that the light emitters 621 may glow in different colors. For example, one of the two light emitters 621 may emit green light, and the other one of the two light emitters 621 may emit orange light. Steady green light may indicate that the image forming apparatus 1 has print data to be processed; and blinking green light may indicate that the image forming apparatus 1 is receiving print data, processing print data, printing an image, or cancelling a print job. Blinking orange light may indicate that the image forming apparatus 1 is experiencing an error.

The communication interface 7 may connect the image forming apparatus 1 with an information terminal device, such as a smartphone or a tablet computer, wirelessly. A communication method to connect the image forming apparatus 1 with the information terminal device may include, for example, a short-range wireless communication method such as near field communication (NFC), Bluetooth, and infrared communication.

The communication interface 7 includes a contact surface 71 at a position between the operation unit 4 and the light emitters 621 on the upper face 22 of the image forming apparatus 1. The contact surface 71 occupies a part of the upper face 22 of the housing 2. In other words, a part of the upper face 22 of the image forming apparatus 1 serves as the contact surface 71. At a central area in the contact surface 71, printed is a sign 711, which indicates a position to be touched by the information terminal device to establish the communication. The user may visually recognize the sign 711 and place the information terminal device on the contact surface 71 so that the information terminal device may contact the contact surface 71 in order to establish the wireless communication between the information terminal device and the image forming apparatus 1.

[Communication Interface]

Detailed configurations of the communication interface 7 and the lamp unit 6 will be described below. The communication interface 7 includes the contact surface 71, a communication board 72, and a looped antenna 73 mounted on the communication board 72. The communication board 72 is covered by the housing 2 and is arranged underneath the contact surface 71 to spread in parallel with the contact surface 71. The communication board 72 includes a communication circuit and a detective circuit, which are not shown. The communication circuit may process radio waves exchanged with the information terminal device into signals. The detective circuit may detect a current carried in the looped antenna 73 to detect intensity of the radio waves exchanged through the looped antenna 73.

The communication board 72 includes an aperture portion 721 (see FIG. 2), which is formed at a position to coincide with the sign 711. At a circumferential edge of the aperture portion 721, arranged is the looped antenna 73. In other words, the looped antenna 73 is looped around the aperture portion 721. The looped antenna 73 may exchange the radio waves with the information terminal device.

The communication interface 7 may be arranged at a downstream position within the housing 2 with regard to a direction to pull the sheet cassette 3 outward. In this arrangement, the communication interface 7 may be located closer to the user who operates the image forming apparatus 1, and the user may easily place the information terminal device to touch on the contact surface 71.

[Lamp Unit]

Figure 5:
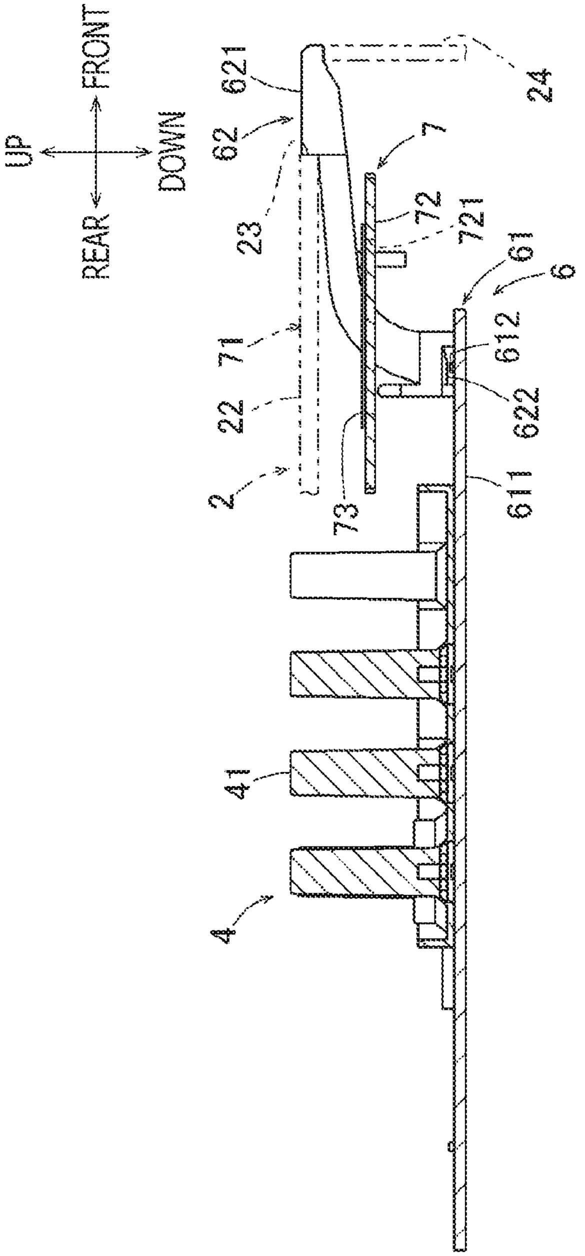
FIG. 5 is a cross-sectional view of the operation unit, the lamp unit, and the communication interface in the image forming apparatus according to the embodiment of the present disclosure viewed at a line A-A shown in FIG. 4.

The lamp unit 6 includes a light source unit 61 and a light guide 62. The light source unit 61 is arranged at a position opposite to the housing 2 across the communication interface 7 with regard to a direction of thickness of the communication board 72. For example, as shown in FIG. 5, the light source unit 61 may be arranged at a vertically opposite position to the housing 2 across the communication interface 7, i.e., at a lower position with respect to the communication board 72. The light source unit 61 includes a light source board 611 and a light source 612 mounted on the light source board 611.

The light source board 611 is, as shown in FIG. 5, arranged to spread in parallel with the upper face 22 of the housing 2 and the communication board 72. The light source board 611 is a circuit board, on which the light source 612 and the light guide 62 are mounted. The light source board 611 may be a piece of board, on which circuits for the operation unit 4 and the display 5 may be commonly mounted, or may be a piece of board separated from the circuits for the operation unit 4 and the display 5 as long as the light source 612 is mounted thereon.

The light source 612 is mounted on an upper surface of the light source board 611 at a frontward position to coincide with the aperture portion 721. The light source 612 may be a light-emitting diode (LED), which may be effective to reduce a volume of the image forming apparatus 1. The light source 612 may include two (2) light sources 612, which are arranged to face with light entrances 622 of the light guides 62. The light sources 612 may, as mentioned above, emit green light and orange light.

The light guide 62 may include a plurality of, e.g., two (2) light guides 62. Each light guide 62 is elongated to have the light source 612 at one longitudinal end and the light emitter 621 at the other longitudinal end. The light guide 62 extends from the light sources 612 penetrating the communication interface 7 through the aperture portion 721 toward the upper face 22 of the housing 2. In particular, while the light entrance 622 is arranged in proximity to an upper face, i.e., a light-emitting surface, of the light source 612, the light guide 62 extends upward from the light entrance 622, curves upper-frontward through the aperture portion 721, and further extends frontward to the light emitter 621, which is fitted with the opening 23 formed in the housing 2. A lower end of the light guide 62 is placed over the light source 612 and fixed to the light source board 611.

The light guide 62 may be made of transparent resin such as acrylic resin. The light emitted from the light source 612 may enter the light guide 62 through the light entrance 622, travel by being fully reflected in the light guide 62, and exit the light guide 62 through the upper face and the front face of the light emitter 621. The light exiting the light guide 62 may be visually recognized by the user who may stand to face with a front face 24 of the image forming apparatus 1.

Thus, the light guides 62 are arranged to penetrate the communication board 72 through the aperture portion 721, which is encircled by the looped antenna 73. This arrangement may enable the light source board 611 to be arranged at the position to overlap the communication board 72. In other words, the light source board 611 may not necessarily be arranged at a position to avoid the communication board 72, and the image forming apparatus 1 may be downsized. Further, while the communication interface 7 and the light guides 62 may be arranged in proximity to each other, the user interface devices, including the operation unit 4, the display 5, the lamp unit 6, and the communication interface 7, may be efficiently collected to provide better operability.

Further, while the light guides 62 are formed to curve, the light emitters 621 may be arranged at positions offset from the aperture portion 721. In this arrangement, the lamp unit 6 to inform the user of the conditions of the image forming apparatus 1 may emit light at the position offset from the communication interface 7 effectively.

Meanwhile, the light emitters 621 may be arranged at positions displaced from the ejection tray 21. Therefore, the light emitters 621 may be prevented from being concealed or covered by the ejected sheet so that the visibility of the light from the light emitters 621 may be secured.

With the light emitters 621 being exposed outward through the openings 23 formed in the housing 2, the light from the light emitters 621 may be directly recognized by the user. Alternately, an area where the openings 23 are formed may be covered by a translucent material, e.g., translucent resin, and the light emitters 621 may be arranged to face with the translucent resin as long as the light from the light emitters 621 are visible through the translucent resin to the user.

As the light sources 612 are arranged to vertically coincide with the aperture portion 721 in the embodiment described above, it may be preferable that the light sources 612 are arranged to coincide with the aperture portion 721 along the direction of thickness for the communication board 72. In this arrangement, the light sources 612 may be arranged in proximity to the aperture portion 721. In other words, a distance between the light sources 612 and the aperture portion 721 may be shortened, and a length of the light guides 62 may be shortened. Thereby, manufacturing cost for the light guides 62 may be reduced, and light loss in the light guides 62 may be restrained.

As the communication interface 7, the light source unit 61, and the light guides 62 are arranged at the intermediate positions between the operation unit 4 and the front face 24 of the housing 2 along the front-rear direction in the embodiment described above, it may be preferable that the communication interface 7, the light sources 61, and the light guides 62 are arranged at the intermediate positions between the operation unit 4 and a sideward, e.g., a frontward, face of the housing 2 along the direction orthogonal to the direction of thickness for the communication board 72. While the arrangement of the light guides 62 arranged through the aperture portion 721 enables the overlapped arrangement between the light source board 611 and the communication board 72, the communication interface 7, the light source unit 61, and the light guides 62 may be accommodated in the relatively small space between the operation unit 4 and the sideward face of the housing 2 as the user interface devices are collected in the limited area in the image forming apparatus 1.

[More Example]

Although an example of carrying out the invention have been described, those skilled in the art will appreciate that there are numerous variations and permutations of the image forming apparatus that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

Figure 6:
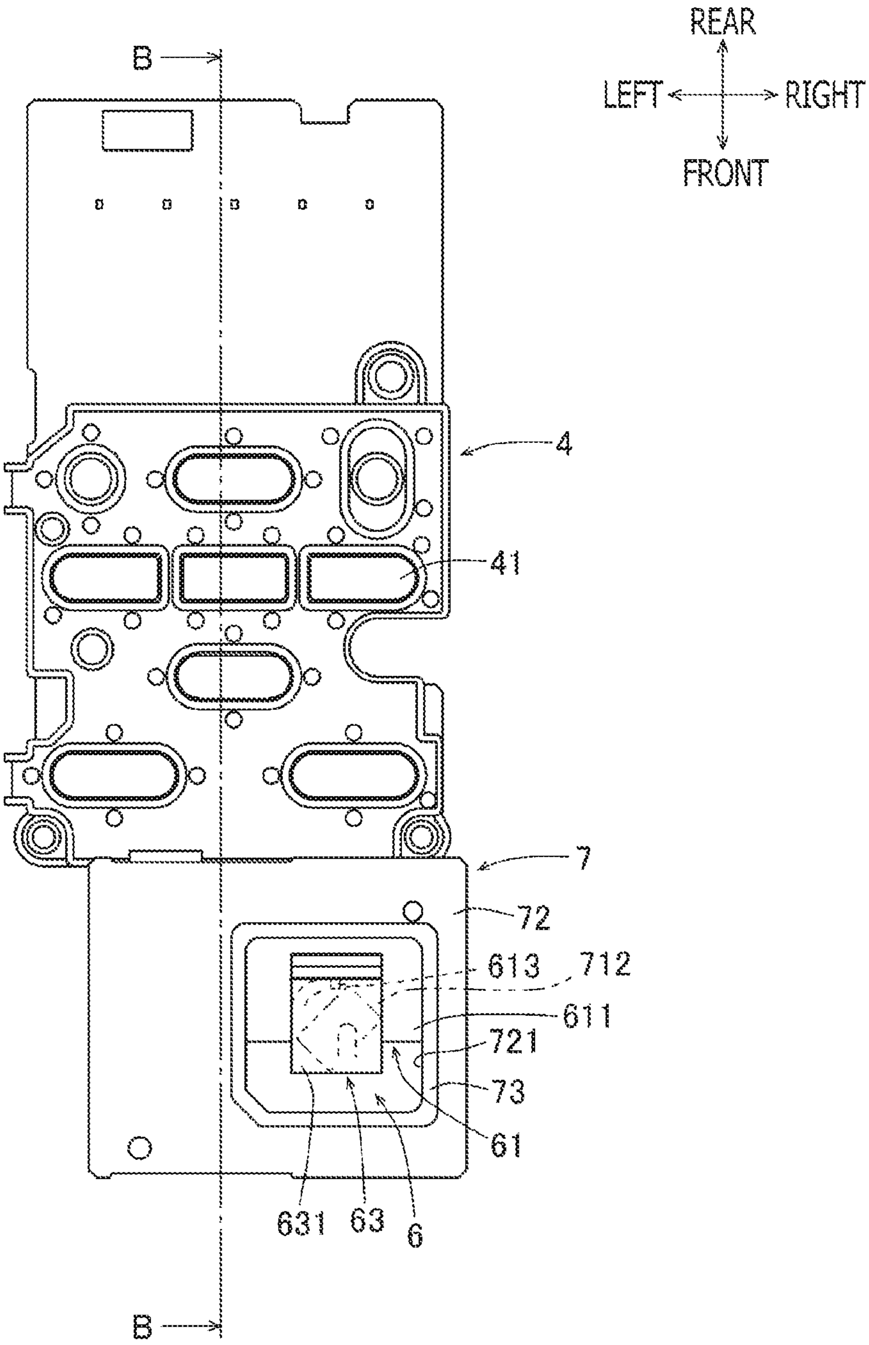
FIG. 6 is a plan view of the operation unit, the lamp unit, and the communication interface in the image forming apparatus according to another embodiment of the present disclosure.
Figure 7:
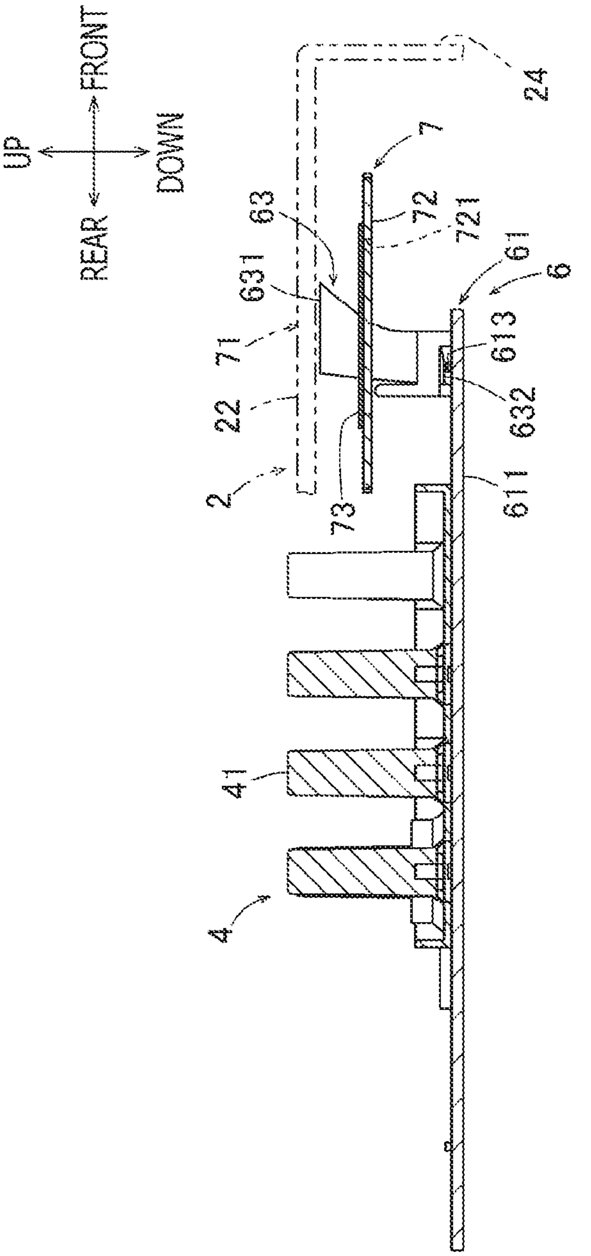
FIG. 7 is a cross-sectional view of the operation unit, the lamp unit, and the communication interface in the image forming apparatus according to the another embodiment of the present disclosure viewed at a line B-B shown in FIG. 6.

For example, the light guide 62 may be replaced with a light guide 63, which is shown in FIGS. 6-7. The light guide 63 may include a light entrance 632, which is placed to face with a light source 613, and a light emitter 631, which is placed to coincide with a sign 712 formed on the upper face 22 of the housing 2. The light guide 63 may extend upward from the light entrance 632 penetrating the communication board 72 through the aperture portion 721 and further extend upper-frontward to the light emitter 631. A lower end of the light guide 63 may be arranged over the light source 613 and may be fixed to the light source board 611.

The housing 2 may be transparent partly, at an area in which the sign 712 is formed. For example, a part of the housing 2 may be cut and removed at the area in which the sign 712 is formed, and the sign 712 may be formed on a piece of transparent material and may be fitted to the cut-and-removed portion. Thereby, the light from the light source 613 may enter the light guide 63 through the light entrance 632, travel by being fully reflected in the light guide 63, and exit the light guide 63 through the light emitter 631. The light exiting the light guide 63 may illuminate the sign 712, which is arranged at a position above the light emitter 631. The light transmitted through the sign 712 may be visually recognized by the user who may stand to face with the front face 24 of the image forming apparatus 1.

In this arrangement, in which the light emitter 631 is arranged to vertically coincide with the aperture portion 721, the sign 712 may be illuminated. The sign 712 may be illuminated when, for example, the image forming apparatus 1 is ready to communicate with the information terminal device. It may be noted that the light emitter 621 that may emit light to indicate the conditions of the image forming apparatus 1 described in the previous embodiment and the sign 712 that may be illuminated may coexist in the same image forming apparatus 1.

[Benefits]

The image forming apparatus 1 includes the housing 2 and the communication interface 7. The communication interface 7 includes the communication board 72 and the looped antenna 73. The communication board 72 is arranged to be covered by the housing 2 and has the aperture portion 721. The looped antenna 73 is for near field communication and is arranged on the circumferential edge of the aperture portion 721 to be looped around the aperture portion 721. The image forming apparatus 1 further includes the light source unit 61 including the light source board 611 arranged at the position opposite to the housing 2 across the communication interface 7 along the direction of thickness of the communication board 72 and the light source 612 mounted on the light source board 611. The image forming apparatus 1 further includes the light guide 62 extending from the light source 612 through the aperture portion 721 toward the housing 2.

With the light guide 62 penetrating the communication board 72 through the aperture portion 721, which is encircled by the looped antenna 73, the light source board 611 may be arranged at the position coincident with the communication board 72. In other words, the light source board 611 and the communication board 72 may not necessarily be arranged to be offset to each other, and the image forming apparatus 1 may be downsized. Further, while the communication interface 7 and the light guides 62 may be arranged in proximity to each other, the user interface devices may be efficiently collected to provide better operability.

Meanwhile, the light source 612 may be arranged to coincide with the aperture portion 721 along the direction of thickness of the communication board 72.

In this arrangement, the light source 612 may be arranged in proximity to the aperture portion 721. Therefore, the distance between the light source 612 and the aperture portion 721 may be shortened, and a length of the light guides 62 may be shortened. Thereby, manufacturing cost for the light guides 62 may be reduced, and light loss in the light guides 62 may be restrained.

Further, the light guide 62 may include the light emitter 621 configured to emit light. The light emitter 621 may be exposed outward through the opening 23 formed in the housing 2.

In this arrangement, the light exiting the light guide 62 from the light exit 621 may be directly recognized by the user. Therefore, a translucent member, which may transmit the light at the part of the housing 2 that faces with the light exit 621, may not be required.

Further, the light emitter 621 may be arranged at the position offset from the aperture portion 721 along the direction of thickness of the communication board 72.

In this arrangement, the lamp unit 6 to inform the user of the conditions of the image forming apparatus 1 may emit light at the position offset from the communication interface 7 effectively.

Further, the light emitter 621 may be arranged at the position to coincide with the aperture portion 721 along the direction of thickness of the communication board 72.

In this arrangement, the communication interface 7 may be partially illuminated. Therefore, for example, the area containing the sign 712, at which the information terminal device may contact the communication interface 7, may be illuminated.

Further, the housing 2 may include the ejection tray 21, on the upper side of which the sheet with the image formed thereon may be placed. The light emitter 621 may be arranged at the position displaced from the ejection tray 21.

In this arrangement, the light emitter 621 may be prevented from being concealed by the ejected sheet so that the visibility of the light from the light emitter 621 may be secured.

Meanwhile, the light source 612 may include a light-emitting diode.

The LED as the light source may be effective to downsize the image forming apparatus 1.

Further, the image forming apparatus 1 may include the sheet cassette 3 to be pulled outward from the housing 2. The communication interface 7 may be arranged at the downstream position within the housing 2 along the direction to pull the sheet cassette 3 outward from the housing 2.

In this arrangement, the communication interface 7 may be located closer to the user who operates the image forming apparatus 1, and the user may easily place the information terminal device to touch on the contact surface 71.

Further, the housing 2 may include the upper face 22 and the front face 24. Meanwhile, the operation unit 4 to manipulate the image forming apparatus 1 may be arranged on the upper face 22 of the housing 2. The communication interface 7, the light source unit 61, and the light guide 62 may be arranged at positions between the operation unit 4 and the front face 24 of the housing 2 along the direction orthogonal to the direction of thickness of the communication board 72.

In this arrangement, the light source board 61 and the communication board 72 may be arranged to overlap each other. Therefore, the communication interface 7, the light source unit 61, and the light guides 62 may be accommodated in the relatively small space between the operation unit 4 and the front face 24 of the housing 2 as the user interface devices are collected at the limited area in the image forming apparatus 1.

What is claimed is:

1. An image forming apparatus, comprising:
- a housing;
- a communication interface including:
  - a communication board arranged to be covered by the housing, the communication board having an aperture portion; and
  - a looped antenna for near field communication, the looped antenna being arranged on a circumferential edge of the aperture portion to be looped around the aperture portion;
- a light source unit including:
  - a light source board arranged at a position opposite to the housing across the communication interface along a direction of thickness of the communication board, and
  - a light source mounted on the light source board; and a light guide extending from the light source through the aperture portion toward the housing, wherein the light guide includes a light emitter configured to emit light, the light emitter being exposed outward through an opening formed in the housing, and wherein an entirety of the light emitter is arranged at a position offset from the aperture portion along the direction of thickness of the communication board such that the aperture portion does not overlap any portion of the light emitter in the direction of thickness.

2. The image forming apparatus according to claim 1, wherein the light source is arranged to coincide with the aperture portion along the direction of thickness of the communication board.

3. The image forming apparatus according to claim 1, wherein the housing includes an ejection tray, on an upper side of which a sheet with an image formed thereon is placed; and wherein the light emitter is arranged at a position displaced from the ejection tray.

4. The image forming apparatus according to claim 1, wherein the light source includes a light-emitting diode.

5. The image forming apparatus according to claim 1, further comprising:

a sheet cassette configured to be pulled outward from the housing, wherein the communication interface is arranged at a downstream position within the housing along a direction in which the sheet cassette is configured to be pulled outward from the housing.

6. The image forming apparatus according to claim 1, wherein the housing includes an upper face and a sideward face, wherein an operation unit to manipulate the image forming apparatus is arranged on the upper face of the housing, and wherein the communication interface, the light source unit, and the light guide are arranged at positions between the operation unit and the sideward face of the housing along a direction orthogonal to the direction of thickness of the communication board.

* * * * *